United States Patent [19]
Kleider et al.

[11] Patent Number: 5,930,748
[45] Date of Patent: Jul. 27, 1999

[54] SPEAKER IDENTIFICATION SYSTEM AND METHOD

[75] Inventors: John Eric Kleider, Scottsdale, Ariz.; Khaled Assaleh, Irvine, Calif.

[73] Assignee: Motorola, Inc., Schaumburg, Ill.

[21] Appl. No.: 08/893,755

[22] Filed: Jul. 11, 1997

[51] Int. Cl.[6] .................................................. G10L 3/02
[52] U.S. Cl. .................... 704/219; 704/246; 704/249; 704/270; 704/222
[58] Field of Search .................................... 704/203, 204, 704/221, 222, 223, 219, 248, 249, 246, 270

[56] References Cited

U.S. PATENT DOCUMENTS

| 5,509,104 | 4/1996 | Lee et al. | 704/256 |
| 5,594,834 | 1/1997 | Wang | 704/253 |
| 5,596,679 | 1/1997 | Wang | 704/236 |
| 5,638,486 | 6/1997 | Wang | 704/236 |
| 5,732,392 | 3/1998 | Mizuno et al. | 704/233 |
| 5,749,072 | 5/1998 | Mazurkiewicz et al. | 704/275 |
| 5,848,388 | 12/1998 | Power et al. | 704/239 |

OTHER PUBLICATIONS

An article entitled "Retention In Neural Networks: To Overcome The Catastrophic Forgetting Problem", Master's Thesis–Graduate School, New Brunswick–Rutgers, The State University of New Jersey, by Agarwal, Anshu, Dec. 1992.

*Primary Examiner*—David R. Hudspeth
*Assistant Examiner*—Abul K. Azad
*Attorney, Agent, or Firm*—Gregory J. Gorrie

[57] ABSTRACT

A speaker identification system (10) employs a supervised training process (100) that uses row action projection (RAP) to generate speaker model data for a set of speakers. The training process employing RAP uses less memory and processing resources by operating on a single row of a matrix at a time. Memory requirements are linearly proportional to number of speakers for storing each speakers information. A speaker is identified from the set of speakers by sampling the speaker's speech (202), deriving cepstral coefficients (208), and performing a polynomial expansion (212) on cepstral coefficients. The identified speaker (228) is selected using the product of the speaker model data (213) and the polynomial expanded coefficients from the speech sample.

27 Claims, 4 Drawing Sheets

SPEAKER IDENTIFICATION SYSTEM AND METHOD

CROSS-REFERENCE TO RELATED APPLICATIONS

This application is related to co-pending U.S. patent application Ser. No. 805,540, filed on Feb. 25 of 1997, which is assigned to the same assignee as the present application.

FIELD OF THE INVENTION

This invention relates in general to the field of speaker identification systems, in particular to speaker identification systems employing supervised training.

BACKGROUND OF THE INVENTION

Polynomial classifiers such as pattern recognition systems may include speaker identification systems which typically use pseudo-inverse matrix inversion as part of their speaker training processes. Such training techniques are highly complex, require a large amount of processing resources, and may be mathematically unstable. Furthermore, typical speaker identification training processes are moderately robust and have limited speaker identification performance. Such processes, while being reasonably suited to a small speaker set, become unwieldy for large speaker sets (e.g., greater than 10). Current training processes typically require very large memory storage for a number of very large matrices. Pseudo-inverse matrix inversion is highly inefficient because the memory requirements in the process are at least proportional to the size of the matrix and the number of speakers in the speaker set. As a result, the complexity of the matrix inversion process using pseudo-inverse techniques grows very rapidly as the number of speakers grows.

Thus, what is needed is, an improved speaker training process for speaker identification systems. What is also needed is an improved speaker training process that uses less memory, less processing resources, and is mathematically more stable than typical the pseudo-inverse techniques. What is also needed is a speaker identification system and method having improved speaker identification performance.

SUMMARY OF THE INVENTION

The present invention provides a method of identifying an individual from a predetermined set of individuals using a speech sample spoken by the individual. The speech sample comprises a plurality of spoken utterance, and each individual of the set has predetermined speaker model data. The method comprises the steps of removing silence from the speech sample to create a removed silence speech sample, determining linear predictive (LP) coefficients for the removed silence speech sample using an LP analysis, performing a polynomial expansion on the LP coefficients, and multiplying the expanded coefficients with the speaker model data for each speaker, to create an score vector for each speaker. The method also includes the steps of averaging terms of each score vector to create an average score value for each speaker of the set, and selecting one individual from the set based on the average score value associated therewith. In a preferred embodiment, the method includes the step of providing a probability factor for the selected individual based on a number of average score values above a threshold.

The present invention also provides a method of determining a speech model for each individual speaker of a set of speakers for use in subsequently identifying an individual from the set of speakers. The method comprises the step of removing silence from speech samples from each speaker of the set. Each speech sample comprising a plurality of spoken utterances to create removed silence speech samples. The method also comprises the steps of determining LP coefficients for the removed silence speech samples from each speaker using a LP analysis, vector quantizing the LP coefficients for each speaker to produce vector quantized speaker coefficients, and performing a polynomial expansion on the vector quantized speaker coefficients to define a matrix comprised of speaker characteristics for each speaker of the set. The method also includes the steps of performing a matrix inversion using a row action projection (RAP) process to determine speaker model data for each speaker the set of speakers, the speaker model data being the speech model for each individual speaker, and identifying an individual speaker using the speaker model data.

The present invention also provides a speaker identification system for identifying an individual speaker from a predetermined set of individuals using a speech sample spoken by the individual. The speech sample comprises a plurality of spoken utterances. Each individual of the set has a predetermined speaker model data associated therewith. The speaker identification system comprises a data storage for storing the speaker model data for the individual speakers the set of speakers, and a controller. The controller removes silence from the speech sample, determines LP coefficients from the removed silence speech sample using a linear predictive (LP) analysis, performs a polynomial expansion on the LP coefficients to create expanded coefficients, multiplies the expanded coefficients with the speaker model data for each speaker to create an score vector for each speaker, averages terms of each score vector to create an average score value for each speaker of the set, and selects one individual from the set of speakers based on the average score value associated therewith.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

The exemplification set out herein illustrates a preferred embodiment of the invention in one form thereof, and such exemplification is not intended to be construed as limiting in any manner.

DETAILED DESCRIPTION OF THE DRAWINGS

The present invention provides, among other things, a method of identifying a speaker from a set of speakers. Each speaker has speaker model data associated therewith. The speaker identification method includes the steps of determining speaker coefficients for a speech sample using, among other things, linear predictive analysis. In one embodiment of the present invention, "speaker coefficients" may be termed "feature vectors". The speaker identification method also includes performing a polynomial expansion on the speaker coefficients and combining the coefficients with speaker model data to create a score vector for each speaker of the training set. The speaker is identified by comparison of the score vectors.

The present invention also provides a speaker identification training process which provides speaker model data for a group of speakers. In a preferred embodiment, a supervised training process is employed using a row action projection (RAP) process. The method includes determining speaker coefficients for speech samples using linear predictive analysis. The method also includes vector quantizing the speaker coefficients and performing a polynomial expansion on the coefficients to create a set of speaker coefficients for each speaker of the group of speakers. The RAP process is performed on the polynomial expanded speaker coefficients to determine the speaker model data for each speaker. Each speaker's characteristics are preferably represented by a set of features.

The present invention also provides a speaker identification system. The system includes, among other things, a data storage for storing speaker model data and a controller for performing a speaker identification process. In a preferred embodiment, the system also performs speaker training processes.

Among other things, the system and methods of the present invention use less memory than typical speaker identification systems. In the preferred embodiments of the present invention, the memory usage is substantially linearly proportional to the number of speakers for which training is performed. In accordance with the preferred embodiment of the present invention, the training process operates on a single row of speaker data for performing matrix inversion. The system and methods of the present invention provide a higher speaker identification performance, a more robust speaker identification process and is less complex than typical systems with similar performance.

Figure 1:
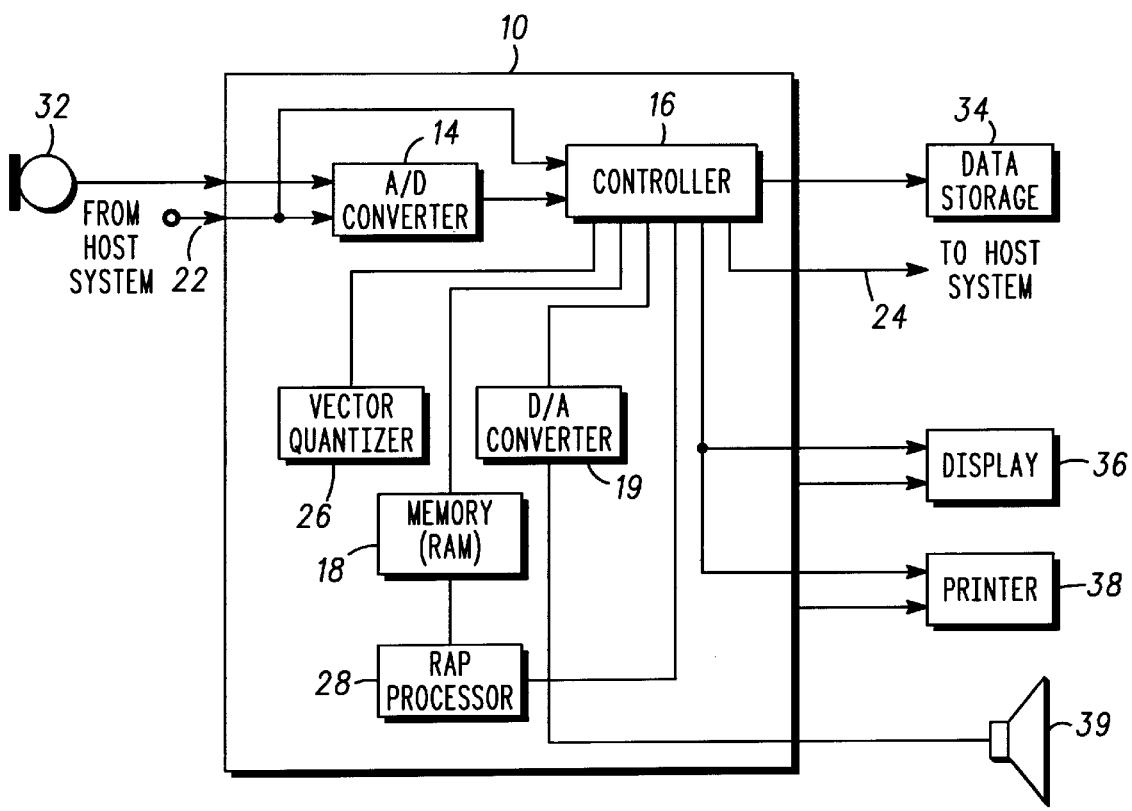
FIG. 1 illustrates a speaker identification system suitable for use with a preferred embodiment of the present invention.

FIG. 1 illustrates a speaker identification system suitable for use with a preferred embodiment of the present invention. Speaker identification system 10 includes analog to digital (A/D) converter 14 for converting speech from analog to digital data. Speech may be provided through microphone 32 or may be provided from a host system at port 22 in analog or digital form. Speaker identification system 10 also includes controller 16 for performing, among other things, the processes discussed below. Speaker identification system 10 includes a vector quantizer 26 coupled to controller 16 for performing vector quantization on speaker coefficients. Controller 16 is also coupled to row action projection (RAP) processor 28 which is suitable to performing a RAP training process on speaker coefficients. Memory 18 coupled to controller 16 is used for, among other things, storing speaker data and speaker model data discussed below. Memory 18 is also suitable for storing other data used by controller 16 or RAP processor 28. In the preferred embodiment, controller 16 is also coupled to Digital to Analog (D/A) converter 19 for converting digital information to an analog form, and for example, providing output to external speaker 39. Controller 16 also may provide output to display 36 or printer 38 when used in identifying a speaker. Controller 16 may also be coupled to an external data storage 34 which may be used to store speaker model data information discussed below. System 10, through controller 16, preferably has output 24 for coupling to a host system. Output 24 may provide an identifier for an identified speaker to the host system. Controller 16, vector quantizer 26 and RAP processor 28 are preferably comprised of a plurality of processors and configured to perform the tasks described below.

Figure 2:
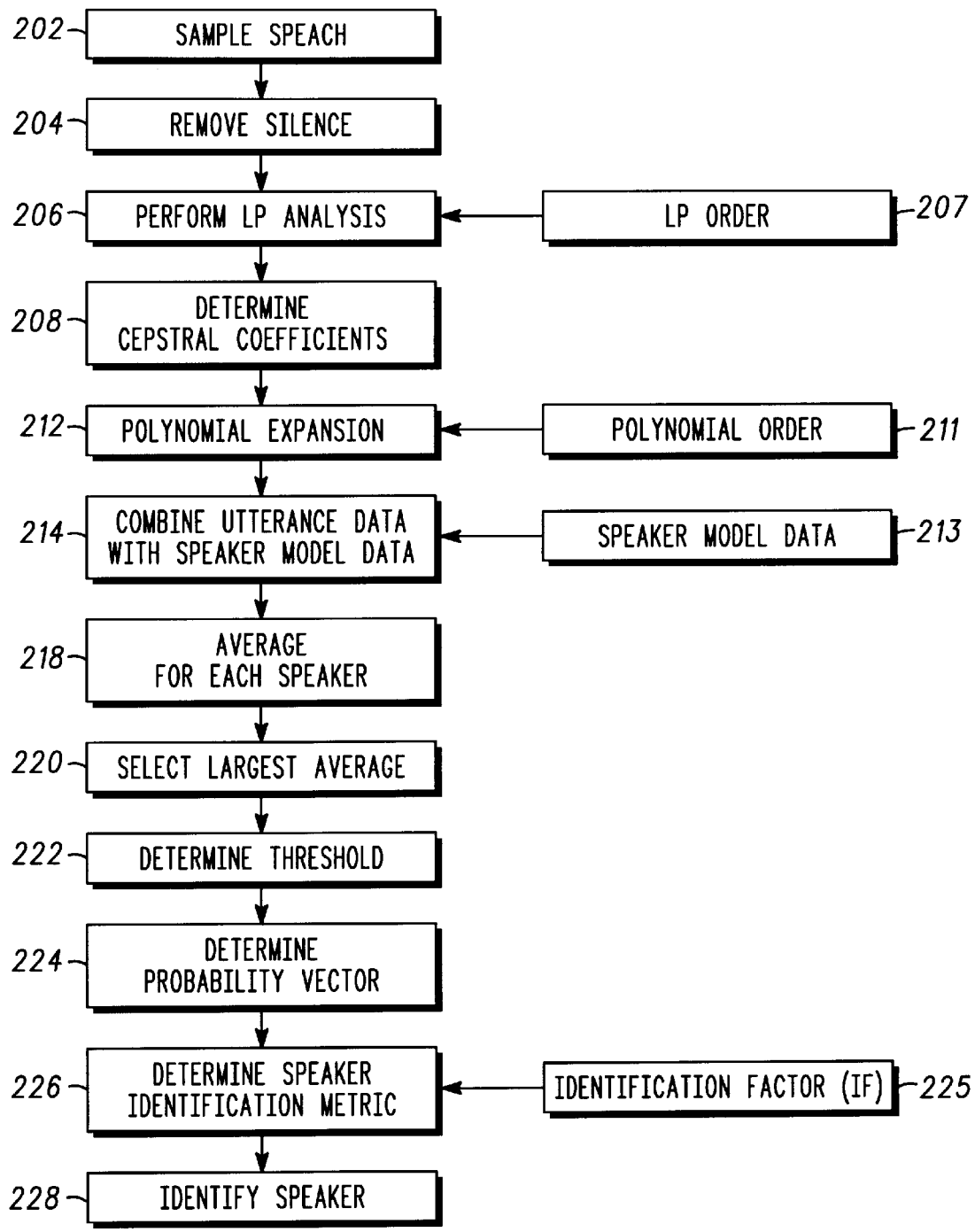
FIG. 2 is a flowchart illustrating a speaker identification process in accordance with a preferred embodiment of the present invention.

FIG. 2 is a flowchart illustrating a speaker identification process 200 in accordance with a preferred embodiment of the present invention. The tasks of process 200 may be performed by hardware or software or a combination thereof and are preferably performed by a speaker identification system similar to that shown in FIG. 1. A primary purpose of speaker identification process 200 is to identify a speaker from a set of speakers based on a speech sample of one of these speakers of the set.

In task 202, a speech sample is obtained from a speaker which is to be identified. In the preferred embodiment the speech sample is received through a microphone and is preferably converted to digital information through an A/D converter. The sample speech information is preferably stored in a memory. In task 204, periods of silence are isolated and removed from the speech sample. The removal of periods of silence in task 204 removes information that is not relevant to identifying a speaker. As a result of task 204 the information contained in the sampled speech uses less storage space in memory.

Task 206 performs a linear predictive (LP) analysis on the sampled removed silence speech from task 204. The LP analysis preferably includes the tasks of modeling a speakers vocal tract shape. Spectral tilt of the vocal tract may be removed with a pre-emphasis filter. Task 206 also involves the step of windowing the speech sample. Preferably the windowing task involves the use of a plurality of overlapping Hamming windows. In the preferred embodiment 30 millisecond Hamming windows are provided every 10 milliseconds. The result of the windowing task results in a plurality of stationary blocks of speech samples. In the preferred embodiment the LP analysis of task 206 includes generating a predetermined number of coefficients for every windowed block of the removed silence speech. Preferably the number of coefficients is determined by the LP order. LP orders of 10, 12 and 16 are desirable however other LP orders may be used. The preferred embodiment uses an LP order of 12. In this preferred embodiment task 206 generates 12 coefficients for every Hamming window (e.g., every 10 milliseconds, 30 milliseconds of removed silence speech). The result of task 206 may be viewed as a Z×12 matrix, where Z is the number of rows and 12 (the LP order) is the number of columns. Z is dependent on the length of the removed silence speech sample, and may be on the order of several hundred or thousand. The Z×12 matrix of task 206 may also be viewed as Z sets of LP coefficients. In this example, there are 12 LP coefficients for every 10 milliseconds of the removed silence speech.

In one embodiment of the present invention where portions of process 200 are implemented in software, the LP order may be inputted to a software programming task 207.

In task 208, cepstral coefficients are determined from the results of task 206. Preferably task 208 includes performing a linear transform on the LP coefficients from task 206. Preferably, the linear transformation performed in task 208 includes a cepstral analysis which separates unwanted from wanted information retaining information important to speech recognition. Task 208 is an optional task of process 200, however, for accurately identifying a speaker, task 208 should be performed. Determining cepstral coefficients is a process known in the art. The result of task 208 may be viewed as a Z×12 matrix where 12 is the cepstral order. The cepstral order may be the same order as the LP order used in task 206.

In task 212 a polynomial expansion is performed on the result of task 208. When the result of task 208 is viewed as a matrix, task 212 involves expanding the terms of each row to a polynomial. When a polynomial order of two is chosen, for example, an expanded row of the matrix includes all first order and second order terms. When the cepstral order chosen is 12, for example, and a polynomial order of two is chosen, the polynomial expansion of a row results in 91 first and second order terms. When the polynomial expansion order is 2, task 212 results in a Z×91 matrix.

The polynomial order used in task 212 for the expansion is preferably either 2, 3 or 4. However, higher or lower order polynomials may also be used. In the case of a third order polynomial expansion, and when the cepstral order is 12, task 212 results in 455 expanded terms (i.e., first, second and third order terms) for each row of the matrix. In this case task 212 results in a Z×455 matrix. The information resulting from task 212 herein is referred to as utterance data. When the utterance data is viewed as a matrix, it is herein referred to as an utterance matrix.

Task 211 provides the polynomial order used in task 212. Task 211 may provide a predetermined polynomial order or may be provided as an input to a speaker identification system which is performing process 200.

In task 214, the utterance data is combined with speaker model data. Speaker model data is preferably retrieved in task 213 from a storage device associated with the speaker identification system. The speaker model data is a set of data that represents speech characteristics of a plurality of speakers. Speaker model data includes data for a predetermined set of speakers. Process 200 is attempting to identify one of those speakers. Speaker model data is preferably created through a speaker training process which involves sampling the speech of each of the speakers of the speaker set. As suitable speaker training process has been described in FIG. 3 (below). Speaker model data of task 213 may be viewed as a matrix with a predetermined set of features for each speaker. When the speaker identification system uses an cepstral order of 12 and a polynomial order of 2 to create the speaker model data, there are 91 features for each speaker. Accordingly, speaker model data in task 213 may be viewed as a 91 by N matrix where N is the number of speakers, and each speaker has a features set of 91 feature set elements. In the preferred embodiment, the number of speakers, N, in speaker model data is on the order of 10 or 20 however it may be as high as 1000 or several tens of thousands.

In the preferred embodiment, task 214 involves multiplying the utterance data from task 212 with the speaker model data of 213. When viewed in matrix form the utterance matrix (which may be a Z×91 matrix) and the speaker model matrix (which may be a 91 by N matrix), when multiplied together results in a Z×1 matrix for each speaker. The number 91 results from a cepstral order of 12 and a polynomial order of 2. The selection of different cepstral orders and polynomial orders result in different size matrixes. However, the cepstral orders of task 208 and the polynomial order selected in task 211 are preferably the same as the cepstral order selected in task 108 and the polynomial order selected in task 111 (FIG. 3) discussed below.

Each Z×1 matrix created in task 214 may be viewed as a score vector associated with the speaker to be identified. Each score vector represents a relation between each speaker of the speaker model data and the sampled speech of the speaker to be identified. Accordingly, by comparing each of these score vectors, the speaker to be identified may be selected and the identity may be determined. Tasks 218 and 220 disclose a preferred way of identifying that speaker.

In task 218, each score vector is averaged, resulting in N values, one value for each speaker of the speaker model data. In task 220, the largest of those N values is preferably selected.

In task 222, a threshold is determined. In the preferred embodiment, the threshold is experimentally determined by computing a percentage of the largest score vector average selected in task 220.

In task 224, a probability vector is determined. Preferably, the probability vector elements are comprised of the probability calculation for each score vector. The probability calculation for a score vector is determined by counting the number of score vector elements which are above the threshold of task 222 and dividing by the total number of score vector elements. The probability vector elements represent the probability that a score vector is above a threshold (task 222).

In task 226, a speaker identification metric is determined. The speaker identification metric is preferably determined by adding the product of the identification factor (input 225) and the averaged score vector (task 218) to the product of identification factor (input 225) subtracted from 1 and the probability vector (task 224). Preferably, each speaker identification metric element is associated with one particular speaker in the speaker model data. In the preferred embodiment, the element of speaker identification metric having the largest value is selected. The identification factor (input 225) is preferably selected from the experimental set of values which provides the most discriminating speaker identification characteristics. In the preferred embodiment, the identification factor is approximately 0.75.

Task 228 identifies the speaker based on the value selected in task 226. As discussed above, each of those N values from task 226 is associated with one particular speaker in the speaker model data. Accordingly, task 228 identifies the value selected with information of the speaker model data. This information may include, among other things, the speakers name, a number that represents the speaker, etc. The speaker identification system, as a result of task 228, may provide one or more of several different outputs. For example, the identified speaker might be displayed on a CRT, a printer, or may be presented in audio form. Alternatively, task 228 may sample attempted access to a restricted access facility or database when an impostor speaker tries to gain access without having clearance. The identified speaker from task 228 may be used in many other ways depending on a host system which implements process 200.

Figure 3:
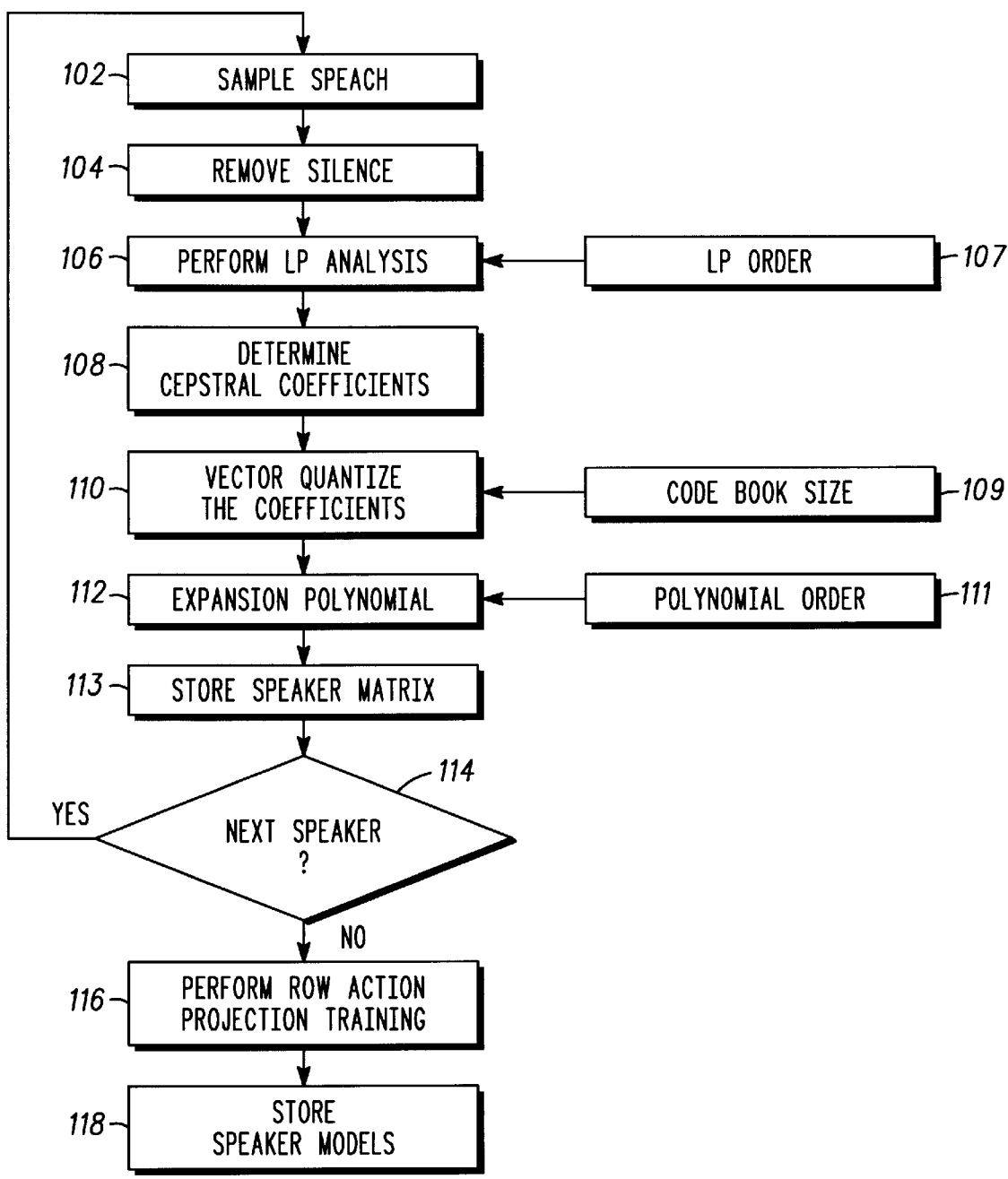
FIG. 3 is a flowchart illustrating a training process suitable for use in a preferred embodiment of the present invention.

FIG. 3 is a flowchart illustrating a training process suitable for use in a preferred embodiment of the present invention. Training process 100 is preferably performed by a computer system and may be performed by a speaker identification system similar to that of speaker identification system 10 of FIG. 1. Training process 100 samples the speech of a plurality of different speakers and creates a speaker model database which is used in identifying one of the speakers. Training process 100 is referred to as a supervised training process because it uses information from the other speakers to derive speaker model data for one speaker.

In task 102, speech is sampled from a first speaker. Task 102 may be performed through the use of a microphone however, speech samples may be provided from a memory or other storage device. In task 102, the speech sample is converted to digital form if not received in digital form. Preferably the speech sample is stored in a memory.

In task 104, periods of silence in the sampled speech are isolated and removed. As a result of task 104, the speech sample from task 102 uses less memory for storage, while retaining relevant speech characteristics information. Task 106 performs an LP analysis on the removed silence speech sample. Preferably, task 106 performs similar steps to that of task 206 (FIG. 2) described above. Task 107 provides the LP order similar to task 207 (FIG. 2) described above. Task 108 performs a linear transformation on the LP coefficients, including, preferably determining the cepstral coefficients. Task 108 is preferably similar to that of task 208 (FIG. 2) described above. The result of task 108 may be viewed as a Z×12 matrix, where 12 is the cepstral order. The cepstral order may be the same as the LP order from task 107. Z is related to the number of Hamming windows associated with the speech sample.

In task 110, a vector quantization is performed on the cepstral coefficients from task 108. One purpose of task 110 is to cluster the speech information for each speaker into a common size matrix representation. Because tasks 102 through 113 are performed for each speaker, task 108 may result in a different number of cepstral coefficients for each speaker because each speaker may have a speech sample of a different time length. The vector quantization of task 110 results in a predetermined set of features for each speaker.

In the preferred embodiment, task 110 involves performing a vector quantization of a predetermined codebook size. Codebook sizes are two raised to the n ($2^n$) where n is an integer preferably between 1 and 20. Desirably n is either 6, 7 or 8 and preferably n is 7. In the preferred embodiment, when n is seven, a codebook size of $2^n$ results in 128 sets of features for each speaker. Accordingly, when the cepstral order of task 108 is 12, task 110 results in 128 sets of 12 coefficients for each speaker. This may be viewed as a matrix in which there are 128 rows and 12 columns. Each row represents one feature set. Accordingly, task 110 results in 128 feature sets for the speaker for which task 110 is being performed. The codebook size may be predetermined or it may be provided as a system input in task 109. When the codebook size is 128 and the cepstral order is 12, the feature matrix is a 128×12 matrix. For each speaker, there are 128 feature sets, each feature set having 12 feature elements. The result of task 110 is herein referred to as a feature set matrix for a particular speaker.

In task 112, a polynomial expansion is performed on each of the feature sets provided from task 110. Task 112 performs a polynomial expansion similar to that of task 212 (FIG. 2) The result of task 112 may be viewed as a speaker matrix having the codebook size number of rows and 91 columns where 91 is a result of the cepstral order number of coefficients expanded by the polynomial order of task 111.

In task 113, the speaker matrix is preferably stored in memory or a other suitable storage location associated with a suitable speaker identification system such as speaker identification system 10 (FIG. 1).

Task 114 repeats tasks 102 through 113 for each speaker's speech sample for which training process 100 is being performed. Accordingly, after the completion of task 114, a speaker matrix has been created and preferably stored. In the preferred embodiment, using an cepstral order of 12, a polynomial order of two and a codebook size 128, task 114 results in a 128×91 matrix of data representing each speaker. When viewed in this matrix format, each row represents a set of features for the associated speaker.

In task 116, a row action projection (RAP) training process is preferably performed on the speaker data from task 114. When viewed as a matrix having 128 rows for each speaker, and 91 columns, task 116 may be viewed as a task of inverting the speaker matrix. Matrix inversion is a technique known in the art. However, a preferred method of solving a set of linear equations for a set of unknowns suitable for use in the preferred embodiment of the present invention is described in FIG. 4. Process 400 of FIG. 4 is suitable solving a set of linear equations for a set of unknowns in task 116.

The result of task 116 is speaker model data for a set of speakers. Each speaker of the set has a set of features associated therewith. The speaker model data may be viewed as a matrix (W) having rows and columns. Each of the columns represents the characteristics of one of the speakers. Accordingly, the number of columns is associated with the number of speakers which is discussed above. The number of rows is dependent on the cepstral order and the polynomial expansion order. When an cepstral order of 12 is chosen and a polynomial order of 2 is chosen there are 91 rows. In task 118, the speaker model data is preferably stored in either memory or a storage location associated with the speaker identification system. In a preferred embodiment, the speaker model data is stored on a disk or CD ROM. This speaker model data is suitable for use in task 214 (FIG. 2).

Figure 4:
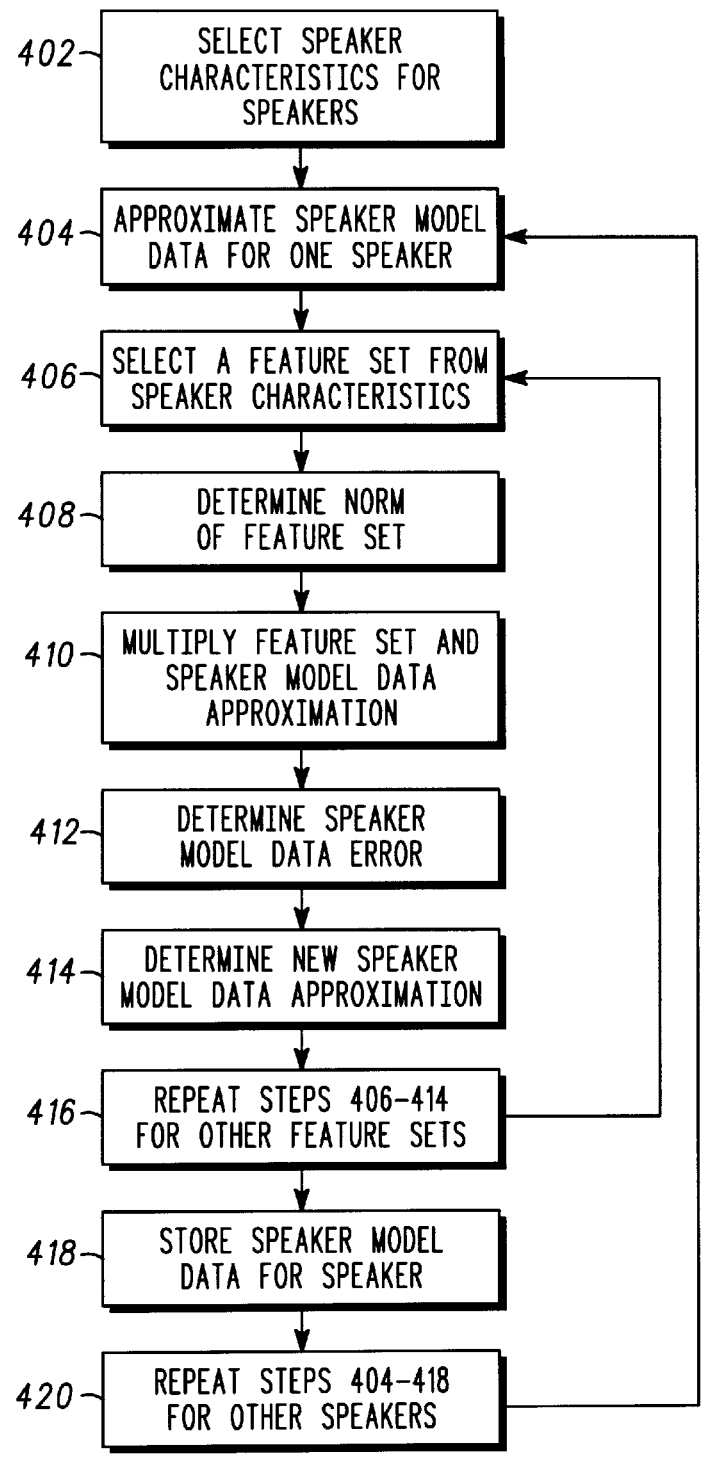
FIG. 4 is a flowchart illustrating a row action projection (RAP) training process suitable for use in a preferred embodiment of the present invention.

FIG. 4 is a flowchart illustrating a row action projection (RAP) training process suitable for use in a preferred embodiment of the present invention. Process 400 may be performed on a computer system or may be performed by a speaker identification system such as speaker identification system 10 (FIG. 1). Process 400 may be used to perform task 116 of training process 100 (FIG. 3). In this case the speaker characteristics may be viewed as a matrix having 128* N rows and 91 columns. N is the number of speakers in the set.

In task 402, the speaker characteristics for all speakers for which process 400 is being performed are selected. The number of rows for each speaker depends on the codebook size used in task 110 (FIG. 3). The example described herein uses a size 128 codebook. The number of columns, 91, depends on the cepstral order used in task 108 and the polynomial expansion order used in task 112. In the example discussed herein, there are 91 columns. The number of sets of 128 rows is dependent on the number of speakers for which training process tasks 102 through 113 had been performed. When the speaker characteristic matrix had been stored in a storage location, task 402 includes the task of transferring the speaker characteristics from a storage location to a memory which is accessible to a processor performing training process 400.

In task 404, speaker model data for a first one of the speakers is approximated. In the preferred embodiment, task 404 may involve guessing at an initial set of speaker model data for the first speaker. The speaker model data for a first speaker may be viewed as a weight vector for that speaker. In the example where the speaker characteristic matrix of task 113 has 91 columns, the weight vector has 91 elements. In the preferred embodiment, each weight vector element has a value between −0.5 and 0.5, however, other ranges are also suitable depending on the specific implementation of this process.

In task 406, a feature set from the speaker characteristics is selected. In the preferred embodiment, the feature set may be viewed as the first row of the matrix retrieved in task 402. In task 408, the norm of the selected feature set is determined. In the embodiment discussed above, the feature set may be viewed as a vector having 91 elements. In the preferred embodiment, the $L_2$ norm of the feature set is determined in task 408. Task 408 results in a value that is associated with a particular feature set. In the preferred embodiment, where the speaker characteristics are viewed as a matrix of 91 columns and 128* N rows. There are 128* N feature sets, each speaker having 128 different feature sets. Accordingly, there are a 128* N norms associated with the speaker sets. Task 408 may be performed prior to start of process 400 and the norms associated with the speaker feature sets may be precomputed and stored.

In task 410, the feature set selected in task 406 is multiplied by the speaker model data approximation of task 404. The speaker model data approximation, as discussed above, is preferably a 91×1 vector, while the selected feature set is a 1×91 vector. In the preferred embodiment, a dot product is performed on the feature set and the speaker model data approximation which results in a scalar value.

In task 412, the speaker model data error is determined. In the preferred embodiment, the speaker model data error is determined by computing the dot product of the feature set and speaker model data approximation and subtracting that scalar value from the associated element of predetermined vector Y. Vector Y is preferably a vector comprised entirely of 1's and 0's. In the example, the length of the Y vector is 128* N. The 1's in the vector Y are associated with the rows for the speaker for which tasks 406–414 are being performed. In the case of the first speaker, for example, the first 128 elements of vector Y are set to one while the remaining are set to 0. In the case of the second speaker, the second set of 128 values of Y is set to 1 while the others are set to 0. Accordingly, the subtraction of the dot product from the Y vector element results in an error value.

In task 414, a new speaker model data approximation is determined. Preferably task 414 determines the new speaker model data approximation using the error (task 412), the $L_2$ norm of the feature set (task 408), the feature set (task 406) and the speaker model data approximation from the initial speaker model data approximation (task 404). In the preferred embodiment, the feature set is multiplied by the error and step size which is then divided by the $L_2$ norm squared. The result is added to the initial speaker model data approximation. The first time through, task 414 produces a speaker model data approximation for a first speaker. This approximation may be viewed as a vector having a number of elements. The number of elements is determined by the number of features in a feature sets for speaker data. For example, in task 113, the number of features in a feature set of the speaker data from task 113 (FIG. 3) is dependent on the cepstral order (task 108) and polynomial order (task 112).

In task 416, tasks 406–414 are repeated for other feature sets. When viewed as a matrix of feature sets tasks 406–414 are performed for each row of the speaker matrix. In the example discussed above having a codebook size of 128 and N speakers, the matrix has 128* N features sets (rows).

In the preferred embodiment, task 416 repeats task 406–414 by selecting feature sets, (e.g., rows) in an order to help assure equal weighting of the feature sets. Preferably an equal weighting loop is implemented to help assure equal weighting of each of the feature sets. In an example of an equal weighting loop, for a first speaker, tasks 406–414 are each performed for the features sets of speaker 1, then speaker 2, then speaker 1 again, then speaker 3, then speaker 1, then speaker 4, then speaker 1, then speaker 5 etc. For a second speaker, tasks 406–414 are performed for the feature sets of speaker 2, then speaker 1, speaker 2, then speaker 3, speaker 2, speaker 4, speaker 2, speaker 5, etc. This weighting process helps assure that each speaker's feature sets are used substantially equally in determining the approximation of the speaker model data for a particular speaker. Upon completion of task 416, an approximated speaker model data for one speaker is obtained. The speaker model data may be viewed as a vector having a length determined by the polynomial order and cepstral order. When the cepstral order is 12 and the polynomial order is 2, the speaker model data has a length of 91. In other words, the speaker model data for one speaker is represented by 91 features.

In task 418, the speaker model data (task 416) for the speaker is stored. In task 420, tasks 404–418 are performed for each of the other speakers for which the speaker model data is being determined. The result of task 420 is speaker model data for each speaker of the speaker set. The speaker model data, may be viewed as a vector having a length determined by the cepstral order (task 108, FIG. 3) and the polynomial order (task 112, FIG. 3). When the cepstral order is 12 and the polynomial order is 2 each score vector 91 elements. The speaker model data vectors are referred to as the speaker model data for a particular speaker.

An important result of the RAP process for speaker identification is the ability to learn training data without overlearning. Another important result of the RAP process for speaker identification is the convenient means of controlling the degree of learning associated with the speaker models. These results provide robustness for speaker identification, especially when data is presented to the process that is not in the training set. Using the RAP algorithm process for speaker identification, a higher speaker identification rate is achieved over typical speaker identification techniques. Overtrained speaker identification systems typically result in lower performance. In the preferred embodiments of the present invention, speaker identification performance is generally dependent on the number of speakers in the speaker set for which training is performed. In one preferred embodiment, the RAP process provides for additional parameter adjustments to, among other things, vary the number of repeat projections.

Thus, a speaker identification system has been described which overcomes specific problems and accomplishes certain advantages relative to prior art methods and mechanisms. The improvements over known technology are significant. The expense, complexities, and high memory requirements are reduced. Similarly, the expense and complexities of processing resources are reduced.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method of identifying an individual from a predetermined set of individuals using a speech sample spoken by the individual, the speech sample comprising a plurality of spoken utterances, each individual of said set having predetermined speaker model data associated therewith, the method comprising the steps of:

removing silence from the speech sample to create a removed silence speech sample;

determining LP coefficients for the removed silence speech sample using a linear predictive (LP) analysis;

performing a polynomial expansion on said LP coefficients to create expanded coefficients;

multiplying said expanded coefficients with said speaker model data for each speaker, to create an score vector for each speaker;

averaging terms of each score vector to create an average score value for each speaker of the set;

selecting one individual from said set based on the average score value associated therewith.

2. A method as claimed in claim 1 further comprising the step of providing a probability factor for the selected individual based on a number of average score values above a threshold.

3. A method as claimed in claim 2 wherein the selecting step includes the step of selecting said one individual having a greatest of said average score values.

4. A method as claimed in claim 3 wherein the selecting step includes the step of selecting additional individuals from said set, said additional individuals of said set having said average score value within a range of said greatest of said average score values.

5. A method as claimed in claim 1 wherein the performing said polynomial expansion step includes the step of expanding said LP coefficients to a polynomial having an order between two and four inclusive.

6. A method as claimed in claim 1 further comprising the step of windowing said removed silence speech sample to create a plurality of time windows of said removed silence speech sample, and wherein the determining LP coefficients step includes the step of performing said LP analysis, said LP analysis providing a predetermined number of LP coefficients for each time window.

7. A method as claimed in claim 6 wherein the determining LP coefficients step includes providing between eight and sixteen LP coefficients, inclusive, for each time window, each subsequent time windows overlaps at least in part a prior of said time windows.

8. A method as claimed in claim 1 further comprising the step of performing a linear transformation on said LP coefficients to determine cepstral coefficients for said speaker, and wherein the performing the polynomial expansion step includes the step of performing the polynomial expansion on said cepstral coefficients to create said expanded coefficients.

9. A method as claimed in claim 2 wherein the method further comprises the step of filtering the removed silence speech sample with a pre-emphasis filter to remove spectral tilt associated with said removed silence speech sample.

10. A method as claimed in claim 2 further comprising the step of determining said speaker model data for each individual of said set, the determining said speaker model data step comprising the steps of:

removing silence from speech samples from each speaker of the set, each speech sample comprising a plurality of spoken utterances to create removed silence speech samples;

determining speaker coefficients for the removed silence speech samples from each individual using a linear predictive (LP) analysis;

vector quantizing said speaker coefficients for each speaker to produce vector quantized speaker coefficients;

performing a polynomial expansion on said vector quantized speaker coefficients to define a matrix comprised of speaker characteristics for each speaker of said set; and performing a matrix inversion using a row action projection (RAP) process to determine the speaker model data for each speaker said set of speakers.

11. A method of determining a speech model for each individual speaker of a set of speakers for use in subsequently identifying an individual from the set of speakers, the method comprising the steps of:

removing silence from speech samples from each speaker of the set, each speech sample comprising a plurality of spoken utterances to create removed silence speech samples;

determining LP coefficients for the removed silence speech samples from each speaker using a linear predictive (LP) analysis;

vector quantizing said LP coefficients for each speaker to produce vector quantized speaker coefficients;

performing a polynomial expansion on said vector quantized speaker coefficients to define a matrix comprised of speaker characteristics for each speaker of said set;

performing a matrix inversion using a row action projection (RAP) process to determine speaker model data for each speaker said set of speakers, the speaker model data being the speech model for each individual speaker; and identifying an individual speaker using the speaker model data.

12. A method as claimed in claim 11 wherein the identifying step comprises the steps of:

removing silence from an individual speech sample received from the individual speaker to create an individual removed silence speech sample;

determining individual LP coefficients for the individual removed silence speech sample using a linear predictive (LP) analysis;

performing a polynomial expansion on said individual LP coefficients to create individual expanded coefficients;

multiplying said individual expanded coefficients with said speaker model data for each speaker, to create a score vector for each speaker;

averaging terms of each score vector to create an average score value for each speaker of the set;

selecting one individual from said set of speakers based on the average score value associated therewith.

13. A method as claimed in claim 12 further comprising the step of providing a probability factor for the selected individual based on a number of average score values above a threshold.

14. A method as claimed in claim 13 wherein said group of speaker characteristics comprise a plurality of feature sets, and wherein the performing a matrix inversion step includes the steps of:

approximating speaker model data for a first speaker;

determining an error for said approximated speaker model data using a selected feature set from said group of speaker characteristics; and computing revised speaker model data for said first speaker based on said error.

15. A method as claimed in claim 14 wherein the performing said polynomial expansion step includes the step of expanding said vector quantized speaker coefficients for each speaker to a polynomial having an order between two and four inclusive.

16. A method as claimed in claim 14
wherein the method further comprises the step of windowing each of said removed silence speech samples to create a plurality of time windows for each removed silence speech sample, and
wherein said LP analysis provides a predetermined number of LP coefficients for each time window.

17. A method as claimed in claim 16 wherein the determining speaker coefficients step includes providing between eight and sixteen LP coefficients, inclusive, for each time window.

18. A method as claimed in claim 17 wherein each subsequent time window overlaps at least in part a prior of said time windows.

19. A method as claimed in claim 14 further comprising the step of performing a linear transformation on said speaker coefficients to determine cepstral coefficients for said speaker, and wherein the performing the polynomial expansion step includes the step of performing the polynomial expansion on said cepstral coefficients to create said group of speaker characteristics for each speaker of said set.

20. A method as claimed in claim 14
wherein the method further comprises the step of filtering the removed silence speech samples with a pre-emphasis filter to remove spectral tilt associated with said removed silence speech samples.

21. A method of modeling speech data for a set of speakers comprising the steps of:
determining speaker coefficients for speech samples from each speaker using a linear predictive (LP) analysis;
vector quantizing said speaker coefficients for each speaker to produce vector quantized speaker coefficients;
performing a polynomial expansion on said vector quantized speaker coefficients to create a group of speaker characteristics for each speaker of said set; and
training said groups of speaker characteristics using a row action projection (RAP) process to determine speaker model data for said set of speakers,
wherein the performing a polynomial expansion step, the group of speaker characteristics for each speaker of said set represent a matrix of data, and wherein the training step includes the step of determining an inverse of said matrix using said RAP process, said inverse representing said speaker model data for said set of speakers
wherein said group of speaker characteristics comprise a plurality of feature sets, and wherein the training step includes the steps of:
approximating speaker model data for a first speaker;
determining an error for said approximated speaker model data using a selected feature set from said group of speaker characteristics; and
computing revised speaker model data for said first speaker based on said error,
and wherein the determining said error step includes the steps of:
computing a dot product of said selected feature set said approximated speaker model data; and
subtracting said dot product from a Y-vector to determine said error, said Y-vector comprised of a combination of ones and zeros,
and wherein the computing revised speaker model data step includes the steps of:
multiplying said selected feature set by said error and dividing by an $L_2$ norm squared of the selected feature set to produce a speaker model error; and
adding said approximated speaker model data to said speaker model error.

22. A method as claimed in claim 21 further comprising the step of repeating the determining an error and computing revised speaker model data steps for other feature sets of said group of speaker characteristics.

23. A method as claimed in claim 22 wherein the repeating step includes the step of repeating the determining an error and computing revised speaker model data steps for other feature sets, said feature sets being selected in a substantially equal weighting order.

24. A method as claimed in claim 22 further comprising the step of repeating the steps of approximating speaker model data and repeating for other speakers of said set to produce revised speaker model data for each speaker of said set.

25. A method as claimed in claim 22 wherein the vector quantizing step includes the steps of vector quantizing said speaker coefficients using a vector quantizer having a predetermined size codebook, the vector quantizing step providing said predetermined size codebook number of vector quantized speaker coefficients for each speaker.

26. A speaker identification system for identifying an individual speaker from a predetermined set of individuals using a speech sample spoken by the individual, the speech sample comprising a plurality of spoken utterances, each individual of said set having predetermined speaker model data associated therewith, the speaker identification system comprising:
a data storage for storing the speaker model data for the individual speakers the set of speakers; and
a controller for removing silence from the speech sample, determining LP coefficients from the removed silence speech sample using a linear predictive (LP) analysis, performing a polynomial expansion on said LP coefficients to create expanded coefficients, multiplying said expanded coefficients with said speaker model data for each speaker to create an score vector for each speaker, averaging terms of each score vector to create an average score value for each speaker of the set, and selecting one individual from the set of speakers based on the average score value associated therewith.

27. A speaker identification system as claimed in claim 26 further comprising means for determining said speaker model data for each speaker of said set, and wherein said controller has means for removing silence from speech samples from each speaker of the set, determining LP coefficients from the removed silence speech samples for each speaker using a linear predictive (LP) analysis, and
wherein the means for determining said speaker model data comprises:
a vector quantizer for vector quantizing said LP coefficients for each speaker to produce vector quantized speaker coefficients; and
a row action projection (RAP) processor,
wherein said controller has means for performing a polynomial expansion on said vector quantized speaker coefficients to define a matrix comprised of speaker characteristics for each speaker of said set, and
wherein the RAP processor performs a matrix inversion using RAP process to determine the speaker model data for each speaker of said set of speakers.

* * * * *